Sept. 2, 1958　　　　　J. KUSHION　　　　2,849,901
PORTABLE DRILL ATTACHMENTS
Filed Jan. 13, 1955　　　　　　　　　　2 Sheets-Sheet 1
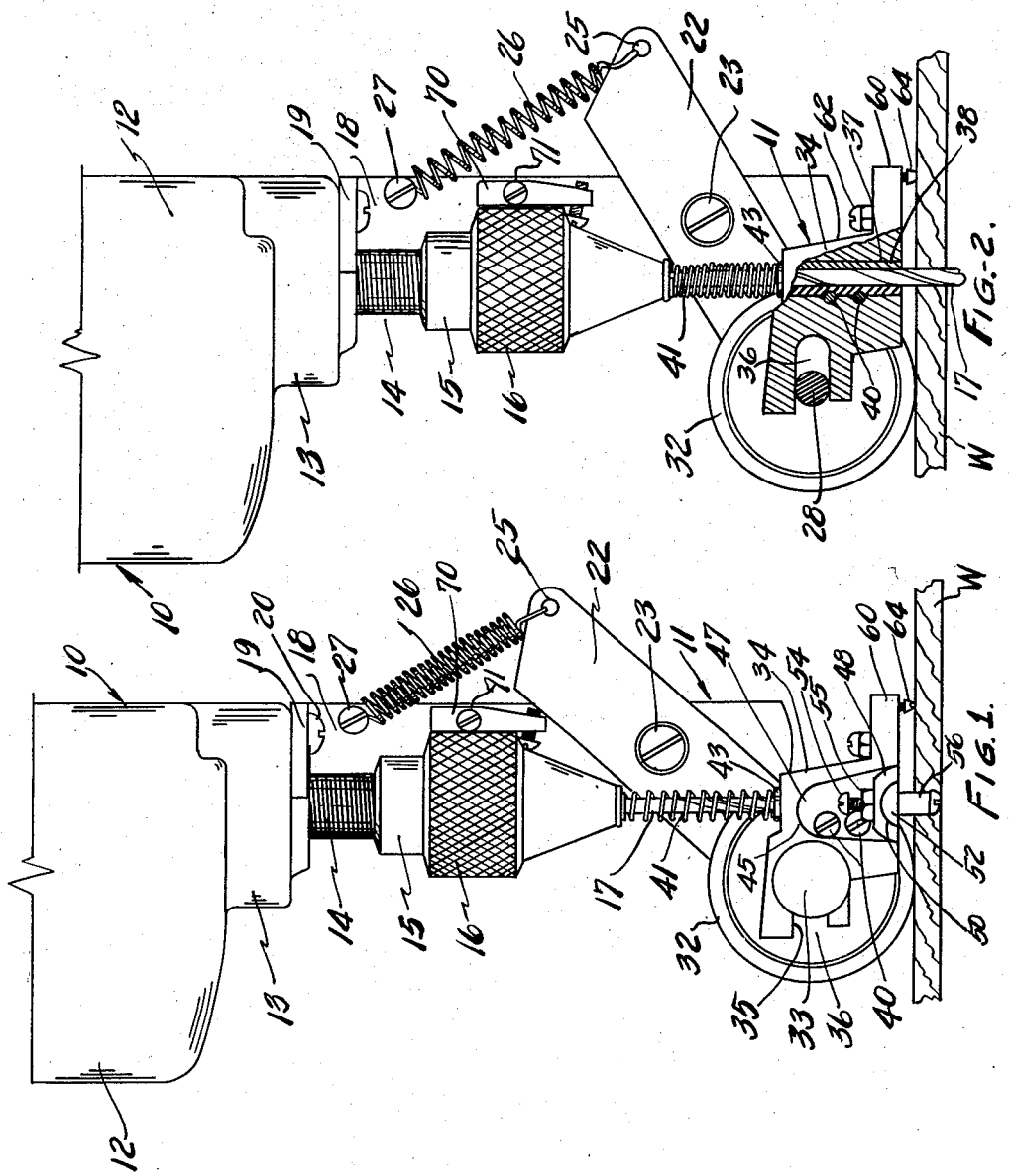
INVENTOR
Joseph Kushion.
BY Fearman & Fearman
ATTORNEY

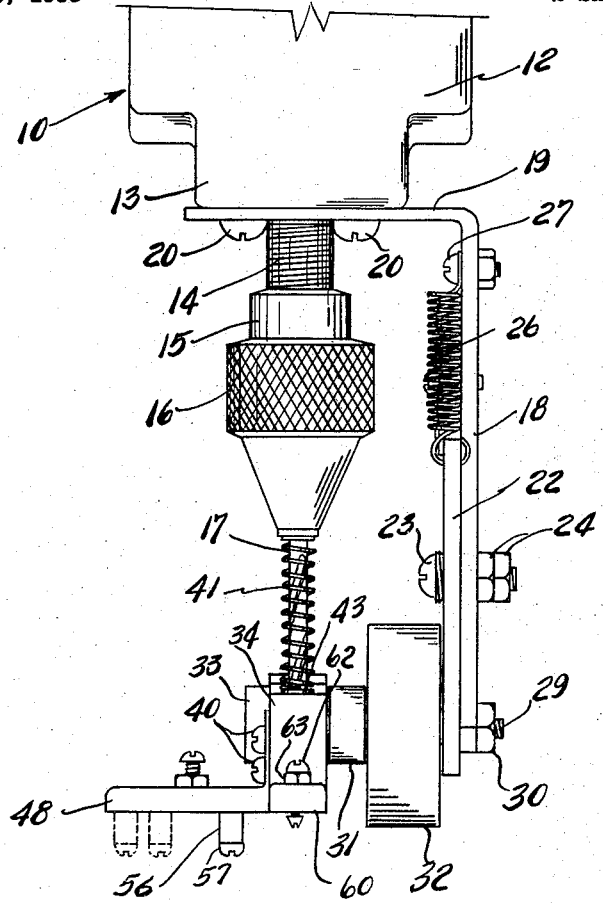
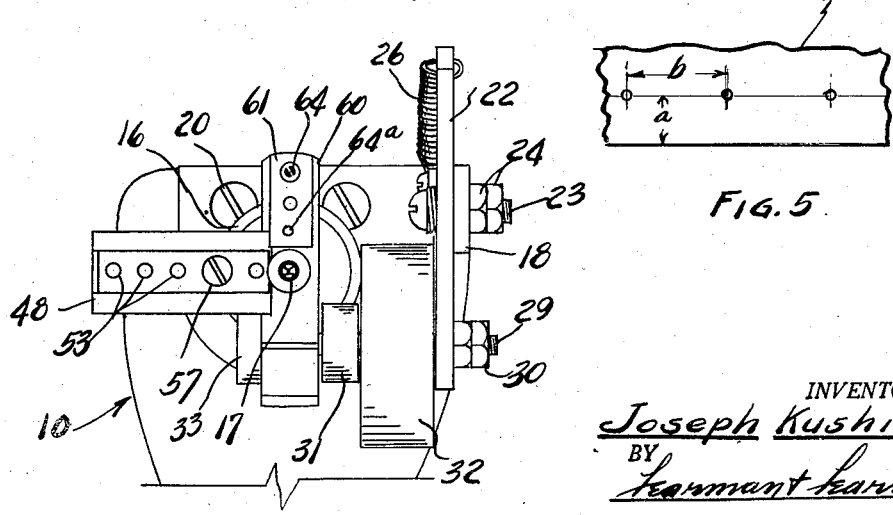

United States Patent Office 2,849,901
Patented Sept. 2, 1958

2,849,901

PORTABLE DRILL ATTACHMENTS

Joseph Kushion, St. Charles, Mich.

Application January 13, 1955, Serial No. 481,513

13 Claims. (Cl. 77—55)

The present invention relates to portable drill attachments, and more especially to a drilling jig for hand drills.

One object of the invention is to provide a drilling jig adapted to be attached to a portable hand drill which will eliminate the laying out of workpieces and scribing or marking the location of holes in the workpiece.

Another object is to provide a drilling jig for a portable hand drill which can easily be manufactured and is comparatively simple in construction.

Another object is to provide a drilling jig for attachment to a portable hand drill in which the bushings can be interchanged to accommodate drill bits of various sizes and diameters.

Another object is to provide a drilling jig for a portable hand drill which is adapted to locate holes without tedious marking or scribing by employing an edge of the workpiece as a straight line guide in the case of longitudinally spaced holes or the curved edge of a workpiece when drilling holes along an arcuate pathway.

Another object is to provide a drilling jig for portable hand drills which is adapted to be used in drilling a series of longitudinally spaced holes in a workpiece which are accurately spaced one from the other and also with respect to a second reference point such as a straight or curved line surface of a workpiece.

Another object is to provide a drilling jig for attachment to a hand drill in which the locator pins can be adjusted to vary the position of the drill from the marginal edge of the workpiece, and thereby adapt the drilling jig to a large number of uses.

Another object is to provide a self-centering pin which is likewise adjustable and is adapted to accurately space the drill bit with respect to an adjacent opening so that the drill bit will be guided in the jig and permit the drilling of holes along a straight or curved line path in an accurate manner.

Another object is to provide a drilling jig attachment for portable hand drills in which the jig fixture can be easily removed to permit access to the chuck and the insertion of different drill bits as required.

Another obect is to provide a mobile drilling jig which can be conveniently moved from one location to another without tiring the worker's hand, or without necessitating exertion on the part of the operator during the drilling operation.

Other objects and advantages of the invention will become apparent during the course of the following description of the accompanying drawings wherein:

Figure 1 is a fragmentary, side elevational view of the portable hand drill and jig attached thereto showing the manner in which the drilling jig is employed for drilling a series of spaced holes in a workpiece, the jig supporting lever being shown in normal position holding the drill bit just above the workpiece.

Figure 2 is a fragmentary, side elevational view showing the jig supporting lever pivoted upwardly to permit the bit to drill through the workpiece.

Figure 3 is a front elevational view showing a fragmentary portion of the portable hand drill and the drilling jig attached thereto with the guide pin shown as being adjustable to various positions, and Figure 4 is a bottom plan view showing the slides for the spacing guide pins.

Figure 5 is a top plan view illustrating a typical workpiece which has openings drilled therein in accordance with the positions of the two guide members in the various views.

In the drawings and more in detail, there is shown a portable hand drill generally designated 10 to which is attached a drilling jig likewise generally designated 11. The portable hand drill 10 includes a casing 12 having a convenient handle (not shown) provided with a switch in circuit with a suitable power source through a cable conductor (likewise not shown).

The casing 12 is adapted to house an electric motor and the end portion of the casing 12 is provided with a projection 13 forming a bearing boss for the armature shaft 14 of the electric motor contained in the casing 12. The projecting end of the armature shaft 14 is threaded for receiving a chuck body 15 having an actuating collar 16 which is adapted to actuate the chuck jaws of the chuck 15 (not shown) so as to frictionally grip a drill bit 17. The above structure is conventional in portable hand drills and is disclosed solely for the purpose of illustrating the manner in which the invention is employed.

The present invention includes a bracket 18 having an angular portion 19 which is adapted to be affixed to the end wall of the bearing bushing 13 by means of suitable threaded fasteners such as machine screws 20. The bracket 18 extends parallel with the armature shaft and terminates slightly below the lower end of the drill chuck (Figures 1 and 2).

Rockably mounted on the depending bracket arm 18 is a lever 22 which is pivotally held in place by means of a fulcrum screw 23 secured in position by a pair of nuts 24. The upper end of the lever 22 is provided with an opening 25 for accommodating the hooked end of a coil spring 26, the other end of the coil spring being affixed to the bracket arm 18 by means of a screw and nut 27. Secured to the lower portion of the lever 22 is a shaft 28 (Figure 2) having a reduced threaded end 29 which is received in a suitable opening in the lower end of the lever 22 in such a manner as to hold the shaft 28 in position. A nut 30 is provided for securely anchoring the shaft 28 to the lower end of the lever 22.

Formed intermediate the ends of the shaft 28 is an enlarged annular boss 31, and interposed between the boss 31 and lever 22 is a roller 32 which is adapted to engage a work surface and permit the hand drill to be supported when the drilling equipment is moved from one location to another with respect to a pair of reference points on the work surface.

The free end of the shaft 28 is likewise provided with an enlarged annular boss 33, thus providing an annular groove between the annular bosses 31 and 33.

Slidably mounted on the shaft 28 between the enlarged annular bosses 31 and 33 is a drill jig casting 34 which is bifurcated as at 35 to provide a horizontal slot 36. The drill jig 34 is provided with a passage 37 which is adapted to receive a hardened steel drill bushing 38 which is held in place by a pair of threaded fasteners 40 which extend transversely of the passage 37 and engage within correspondingly positioned notches in the hardened steel drill bushing 38 and passage 37. The drill bit 17 extends through the drill bushing 38 and a coil spring 41 encircles the drill bit and has one end arranged in abutting relation with the drill chuck body 15, while the other end is arranged in abutting relation, with a washer 43 on the upper portion of the drill jig casting 34.

One of the side walls of the drill jig casting 34 is recessed as at 45 (see Fig. 1) for receiving an angle bracket 47 having an arm 48 which extends transversely of the drill bit axis and has its undersurface slotted as at 50 to accommodate a slide 52. The slide 52 is provided with a series of threaded openings 53 therethrough (Fig. 4) for receiving an anchor screw 54 which is locked in position by means of a lock nut 55. Removably secured to the slide 52 is a guide sleeve 56 for receiving a threaded fastener 57 which is received in one of the openings 53, the sleeve 56 constituting a guide pin as will later be apparent. The angle bracket 47 is secured to the drill jig casting 34 by means of the same screws 40 which hold the drill bushing 38 in position.

Formed integrally with the trailing edge of the drill jig casting 34 is an arm 60 which extends at right angles to the arm 48 and said arm 60 is provided on its undersurface with a groove for receiving a slide plate 61. The slide plate 61 is adapted to be held in a predetermined locked position by means of a locking screw 62 on which is threaded a locking nut 63. A self-centering locator pin 64 has a reduced threaded portion which is received in one of a series of correspondingly threaded openings 64a in the slide 61. The self-centering locator pin 64 is tapered so that it may be received in holes of various diameters and still the center of the pin will coincide with the center of the hole. Thus, the drill jig may be positioned accurately with respect to a previously drilled hole to facilitate the drilling of a series of holes.

The drill fixture or casting 34 is floatingly mounted on the drill bit so that when the drill bit is forced into the work, the lever 22 will be rocked about its pivot 23 and the roller 32 and jig 34 will be moved upwardly.

In operation, the operator grasps the portable hand drill 10 in the usual manner and operates the switch to energize the motor and cause rotation of the drill bit. If it is desired to drill a series of spaced openings in a workpiece W a predetermined distance $a$ inward from a marginal edge thereof, the slide 52 is adjusted to position the guide pin 56 such that when it engages the edge of the work the drill bit 17 will be properly and accurately located for drilling a hole the spaced distance $a$ from the edge of the workpiece W. If the holes are to be spaced a predetermined distance $b$, the self-centering locator pin 64 and its supporting slide 61 are adjusted to the proper distance $b$ from the bit 17 such that when the self-centering pin 64 is received in the first drilled hole the drill bit 17 will be properly and accurately centered to drill another hole exactly the spaced distance $b$ therefrom. The operator merely exerts a pressure on the portable hand tool 10 to cause the drill to feed into the workpiece W and as this occurs, the drilling jig 34 is held in position by the lever 22 and the pin and slot connection between the lever and the drill jig. After the hole has been drilled and the operator is no longer putting pressure on the tool 10, the spring 41 forces the jig 34 downwardly and lifts the drill 10 whence the drill jig can be moved to a new location with the weight of the tool 10 supported by the roller 32. After each hole has been drilled, the hand drill and attachment are rolled to a new position guided inwardly from the marginal edge of the workpiece by the guide pin 56 and located the proper distance from a previously drilled hole by the self-centering guide pin 64.

It is to be noted that the drill fixture or jig remains on the drill bit and the bushing terminates a short distance from the workpiece so as to accurately guide the drill bit and maintain the drill in proper relation throughout the entire drilling operation. When it is desired to substitute drills of various diameter, the chuck is operated to loosen the drill bit by manipulation of the chuck jaw actuating collar 16 whereupon the screws 40 are removed so that the bushing 38 may be drawn out. After a new bit or one of different size has been selected and disposed loosely in the chuck 15, the proper hardened steel bushing 38 is inserted in the bore 37 and the threaded fasteners 40 are isnerted to hold the bushing in place. The collar of the chuck is then manipulated to secure the drill bit in place. The fact that the jig housing 34 is not supported from means directly overhead which denies ready access to the collar 16 is, of course, important when changing bits. Applicant has very nicely solved this problem by providing the lever 22 which supports the jig from the side.

The various parts of the drilling jig may be interchanged with little effort on the part of the operator, thus enabling the portable hand drill to be used in the drilling of a large number of workpieces requiring production methods without sacrificing accuracy.

In order to limit the swinging movement of the lever 22, a bar 70 is affixed to the arm 18 by means of a screw 71. The lower end of the bar 70 is provided with a threaded opening for receiving a stop screw 72, one end of which is presented to an edge of the lever 22 (Figure 1) to limit the upward swinging movement of the lever 22 and the downward movement of the drill jig casting 34.

It is to be understood that the form of the invention herewith shown and described is to be taken as a preferred embodiment thereof, and that various changes in the shape, size and arrangement of parts may be resorted to without departing from the spirit of the invention or the scope of the subjoined claims.

What I claim is:

1. In a drill jig attachment for a portable hand drill having a chuck and drill bit removably mounted therein, a drill jig casting having a bore for receiving said bit, a bushing in said bore for guiding said drill bit, an arm affixed to said portable drill, a lever rockably mounted on said arm, yielding means urging the opposite end of said lever in a downward direction, a pin and slot connection between said lever and drill jig casting and a roller mounted on the axis of said pin to support said drill jig.

2. In a drill jig for a portable hand drill having a tool chuck and drill bit mounted therein, a drill jig casting having a bore, a bushing removably mounted in said bore for receiving and guiding said drill bit, an arm secured to said hand drill, a lever rockably mounted on said arm, a coil spring connecting one end of said lever with said arm, a pin and slot connection between the other end of said lever and said drill jig casting, a pair of locator pins mounted on said drill jig casting adapted to engage a pair of reference points for successively positioning said drill bit to drill openings in a workpiece in spaced relation, and means for adjusting said guide pins with reference to the axis of said drill bit.

3. In a drill jig attachment for a portable hand drill having a chuck and drill bit held therein, an arm secured to said hand drill extending parallel with said drill bit, a lever rockably mounted on said arm, a pin extending transversely of said arm and secured to one end thereof, a coil spring connecting the other end of said lever with said arm to urge the opposite end of said lever in a downward direction, a roller mounted on said pin, a drill jig casting having a bore and a horizontal slot received on said pin, a bushing mounted in said bore for guiding said drill bit, an angle bracket on said casting having a guide pin adjustably carried thereby to engage the edge of a workpiece, and a self-centering locator pin mounted on said casting adapted to engage an opening in the workpiece to center the drill bit for drilling an opening a predetermined distance from said self-centering locator pin.

4. In a drill jig attachment for a portable hand drill having a chuck and a bit held therein, an arm affixed to said hand drill, a lever rockably mounted on said arm, a pin secured to one end of said lever and extending laterally therefrom, a roller on said pin for engaging a work surface, a drill jig having a bore and a horizontal slot, said slot being adapted to receive said pin, a bushing in said bore to receive said bit, a bracket arm secured to the side of said drill jig casting, a locator pin adjustably carried by one arm of said bracket to engage the edge of a workpiece, an arm extending rearwardly from said drill jig casting, a self-centering locator pin adjustably supported by said last mentioned arm to be successively received in drilled openings to position the drill bit when drilling successive openings, and a coil spring connecting said lever to said first mentioned arm to urge the roller and drill jig casting downwardly.

5. In a drill jig attachment for a portable hand drill having a chuck and bit carried thereby, a drill jig casting having a bore and a horizontal slot formed therein, a bushing removably held in said bore for receiving said bit, a lever pivotally supported by said hand drill, a roller on the lower end of said lever, a pin connecting said lever and roller and being received in said horizontal slot, means for yieldingly urging said lever in a direction to force the roller downwardly, yielding spring means surrounding said drill bit to urge the drill jig downwardly, and a pair of locator pins carried by said drill jig adapted to engage separate reference points to permit said drill bit to be located when successively drilling equidistantly spaced openings.

6. In a drill jig mounted on a drill having an extending drill bit, a bracket on said drill, a lever pivotal on said bracket in a plane substantially parallel to the axis of the drill, a jig on the outer end of said lever having a bore through which the drill bit extends, spring means normally maintaining the end of said bit inward of the outer surface of said jig yieldable when the jig is forced inwardly and the lever pivots about its pivotal connection to the bracket as a fulcrum so that the end of the drill bit is exposed, and guides connecting the lever and jig so that the lever can move laterally relative to the jig as it pivots while the jig moves only in an axial direction.

7. The combination defined in claim 6 in which a work engaging wheel is provided on said lever, adjacent to the jig, which rolls along the workpiece laterally with the lever relative to the jig when the latter moves axially inwardly.

8. In combination; a portable hand drill having rotatable bit holding means extending axially from a motor housing adapted to hold a bit therein; a bracket mounted on said motor housing and extending generally parallel to and adjacent said bit holding means; a member swingably connected to said bracket axially outward of said housing; a surface engaging element fixed by the member for movement about the connection of said member and bracket with said member; a drill jig for said bit carried by said member; and means connecting said jig to said member permitting relative movement of said jig and surface engaging elements so that said surface engaging element can move laterally with said member while said jig remains in position to guide the bit axially when said bit is forced downwardly and said surface engaging element pivots said member.

9. In combination; a portable hand drill having rotatable bit holding means extending axially from a motor housing adapted to hold a bit therein; a bracket mounted on said motor housing; a member supported by said bracket extending axially outwardly to a point adjacent the end of the drill bit; said member having a relative movement connection with said bracket; surface engaging roller means for traveling the drill in a lateral direction fixed by said member for movement with said member relative to said bracket when pressure is exerted on said motor housing tending to force said roller against said surface; a drill jig supported on said member for guiding said bit axially when pressure is exerted tending to force it into the workpiece; and means resiliently opposing relative movement of said member and bracket.

10. The combination defined in claim 9 in which said roller means comprises a roller carried by pin means which have a relative motion connection with said drill jig permitting travel of said roller means relative to said jig.

11. In combination, a portable hand drill having rotatable bit holding means extending axially from a motor housing adapted to hold a bit therein; a bracket mounted on said motor housing; a member supported by said bracket extending axially outwardly to a point adjacent the end of the drill bit, said member having a relative movement connection with said bracket; surface engaging roller means for traveling the drill in a lateral direction fixed by said member for movement with said member relative to said bracket when pressure is exerted on said motor housing tending to force said roller means against a surface; a drill jig supported on said member for guiding said bit axially; and means provided on the jig for locating the drill bit relative to the edge of a plate-like workpiece and also relative to a hole therein.

12. In a drill jig attachment for a portable hand drill having a chuck and drill bit held therein; a drill jig having a bore for receiving said bit; a lever supporting said jig to pivot about its rockable support point as a fulcrum when the jig is moved axially relative to the bit to permit the bit to engage and drill a workpiece; and means provided on the jig for locating the drill bit relative to the edge of a plate-like workpiece and also relative to a hole therein.

13. In combination; a portable hand drill having rotatable bit holding means extending axially from a motor housing; a bracket mounted on said motor housing; means mounted on said bracket supporting a surface engaging member which extends in an axial plane; said means having relative movement with said bracket when pressure is exerted on said motor housing tending to force said work engaging member against said surface; a drill jig mounted on said second means for guiding said bit axially when pressure is exerted tending to force it into the workpiece; a support on said jig extending therefrom parallel to the work engaging member; depending pin means, adjustable on said support laterally, adapted to engage in an opening in a workpiece; a second support on said jig extending normally to said first support means; and depending guide means on said second support adjustable inwardly and outwardly relative to said jig normally to said pin means for guiding on the edge of a plate to thereby locate the center of a hole to be drilled relative to a prior hole and the edge of the plate.

References Cited in the file of this patent

UNITED STATES PATENTS

| 1,299,318 | Fogelman | Apr. 1, 1919 |
| 2,612,793 | Timpner | Oct. 7, 1952 |